Dec. 24, 1963   F. C. VOLKMAN   3,115,140
APPARATUS FOR STEREOTAXIC BRAIN OPERATIONS
Filed Aug. 18, 1960   3 Sheets-Sheet 1
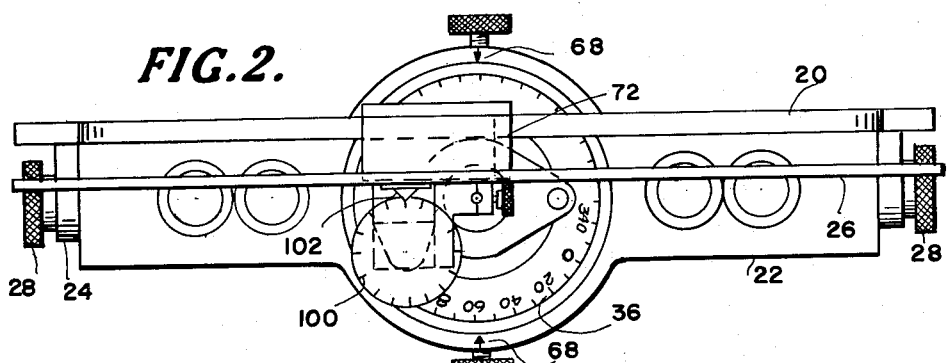
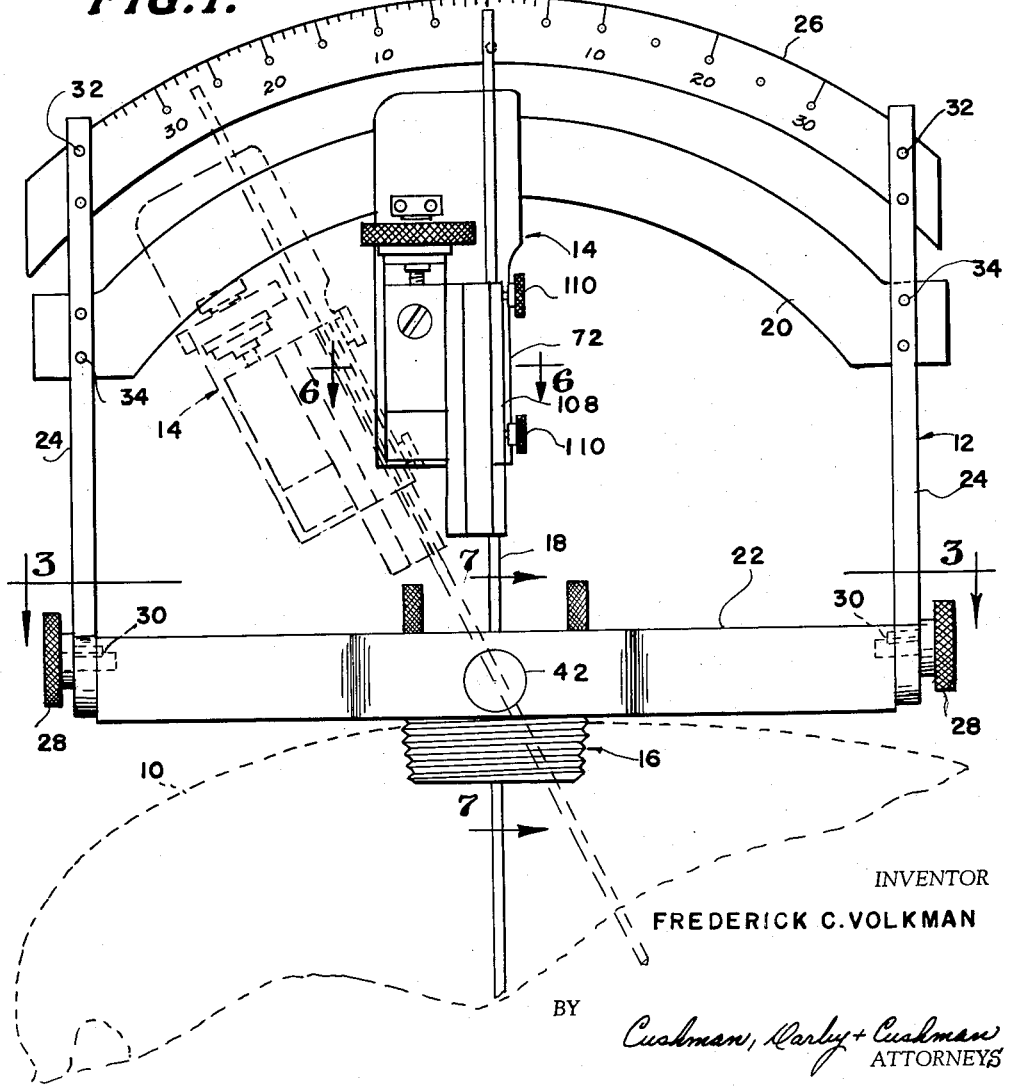
INVENTOR
FREDERICK C. VOLKMAN
BY
Cushman, Darby + Cushman
ATTORNEYS

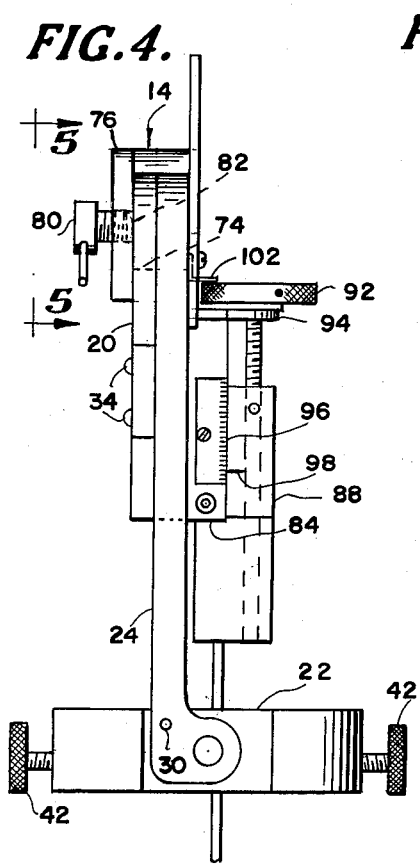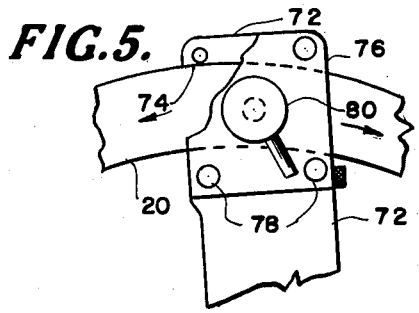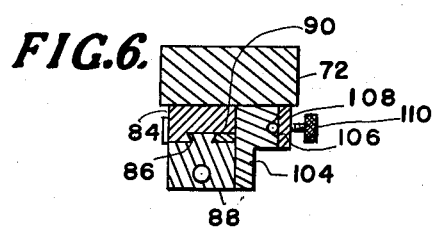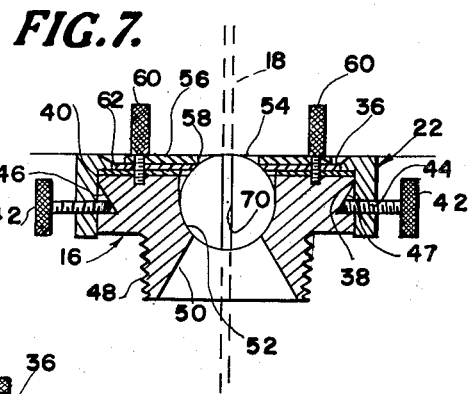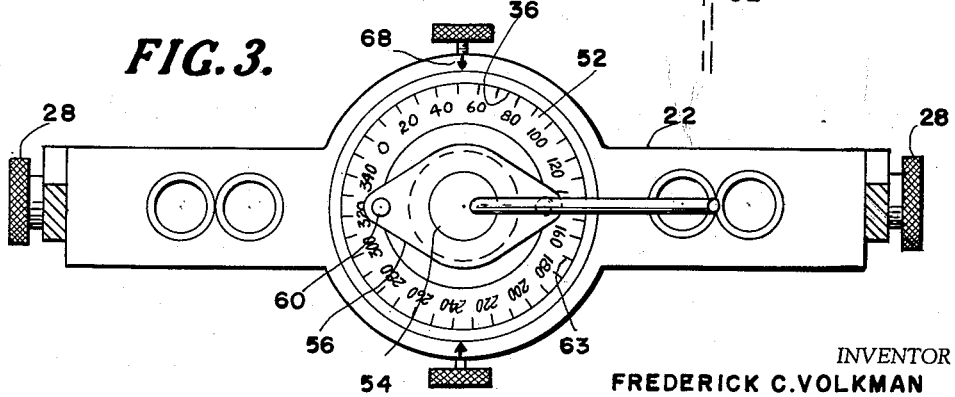

Dec. 24, 1963  F. C. VOLKMAN  3,115,140
APPARATUS FOR STEREOTAXIC BRAIN OPERATIONS
Filed Aug. 18, 1960  3 Sheets-Sheet 3
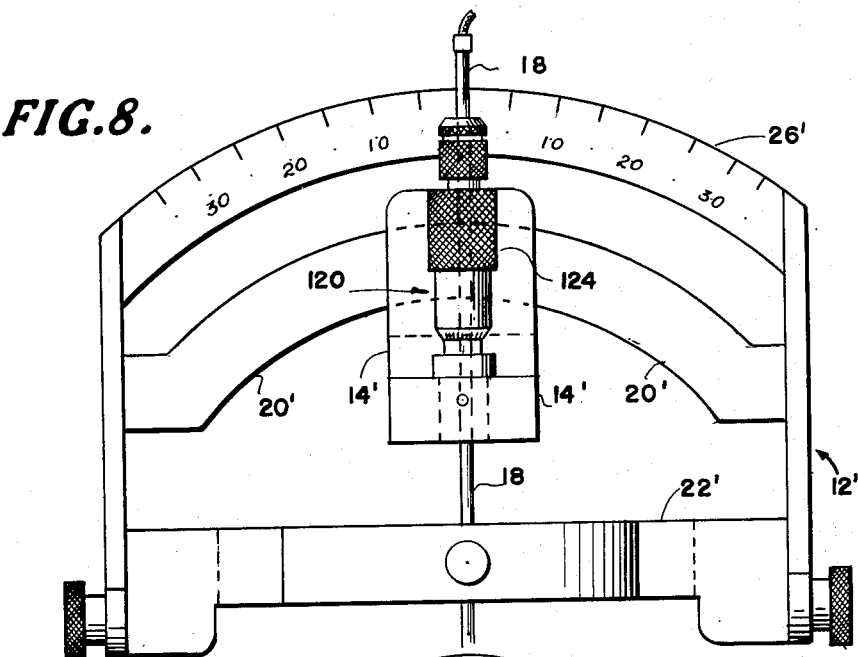
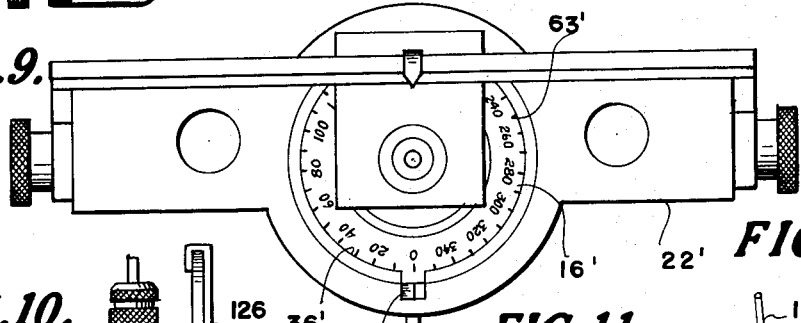
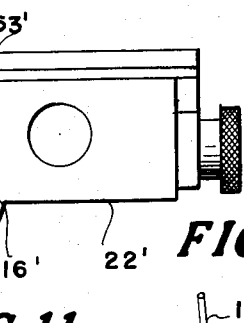
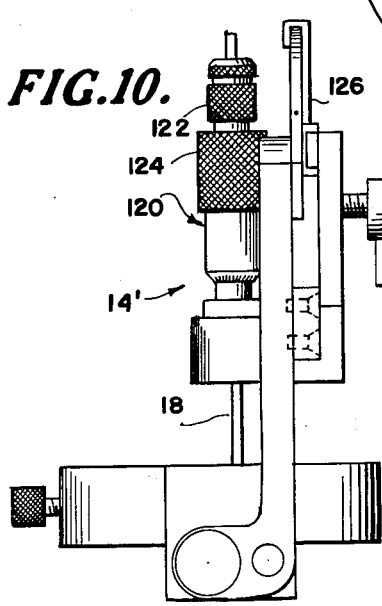
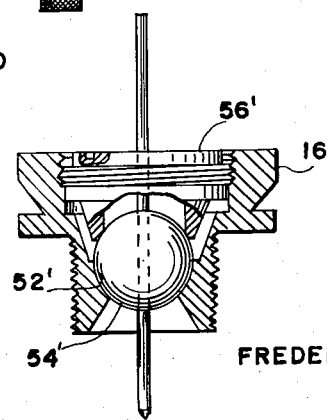
INVENTOR
FREDERICK C. VOLKMAN
BY
Cushman, Darby + Cushman
ATTORNEYS United States Patent Office 3,115,140
Patented Dec. 24, 1963

3,115,140
APPARATUS FOR STEREOTAXIC BRAIN
OPERATIONS
Frederick C. Volkman, Towson, Md., assignor to Baltimore Instrument Company, Baltimore, Md., a corporation of Maryland
Filed Aug. 18, 1960, Ser. No. 50,401
2 Claims. (Cl. 128—410)

The present invention relates to an apparatus for use in implantation of subcortical electrodes in the brain of a patient. More particularly, the present invention relates to an apparatus wherein an electrode may be implanted itno the human brain and accurately positioned to treat desired brain cells.

In recent years a stereotaxic technique has been developed in treatment of certain diseases of the brain. In some instances it has been found that by using electrical impulses from an electrode, certain brain cells may be stimulated in psychotic patients to bring about an emotional behavior change. Another instance of the use of the electrode implantation has been for the destruction of certain diseased brain cells of a patient. Still further uses have been made of subcortical implantation of electrodes for obtaining subcordicograms (deep recordings).

It is of utmost importance to accurately position the electrode upon implantation in the brain of a patient. Heretofore, X-rays have been made of the patient prior to any neurosurgical intervention so as to accurately determine the portion of the brain to be treated. The skull of the patient was accurately positioned and held by suitable apparatus prior to implantation and it was then determined from the X-rays exactly the portion of the skull through which the electrode was to be inserted. A small hole was drilled through the skull and a guide tube was placed therein. Then the electrode was threaded through the guide tube and implanted into the brain. Additional X-rays had to be taken during the course of implantation so as to verify the path of implantation and if it was found that the electrode was finally located more than a few millimeters from a calculated position, both the electrode and the guide tube were removed and reinserted. Assuming the electrode had been accurately positioned, it was necessary to cement the electrode to the skull as soon as the guide tube was withdrawn as the slightest tug on the electrode displaced the same dorsally from its intended position. After treatment for a period of time, the electrode remained cemented in the skull for further treatment and thus careful observation and restraint of the patient was required to prevent the patient from accidentally removing or displacing the electrode.

An object of the present invention is to provide an improved type of electrode implantation apparatus whereby an electrode is implanted in the brain and may be accurately positioned or adjusted while implanted.

Another object of the present invention is to provide an apparatus for implantation of a subcortical electrode whereby the electrode is accurately positioned to treat the brain cells at a calculated position, the apparatus permitting complete removal of the electrode and then reinsertion thereof at a subsequent time to the exact position of previous treatment.

A further object of the present invention is to provide an apparatus for implantation of a subcortical electrode so that the electrode has a frusto-conical range of movement in the area of the brain being treated.

Still another object of the present invention is to provide an apparatus for implantation of a subcortical electrode in the brain of a patient, the electrode being capable of being anchored or locked in a desired position whereby it cannot be accidentally displaced or removed.

Ancillary to the preceding object, it is a further object of the present invention to provide an apparatus for implantation of a subcortical electrode wherein a portion of the apparatus is fixed in an opening in the skull and another portion of the apparatus supporting the electrode is detachably connected thereto whereby the electrode may be removed from the patient without any unnecessary inconvenience and pain during periods of time when treatment is not necessary.

A further object of the present invention is to provide an apparatus for implantation of an electrode in the brain which permits the electrode to be adjusted during implantation to avoid engagement with critical areas thereof. By use of X-rays during implantation of the electrode, the path of the same may be accurately controlled and the end of the electrode can be positioned in a desired localized area of the brain without danger to other areas, for example, the sagittal sinus.

Still another object of the present invention is to provide an apparatus for implantation of a subcortical electrode which is of lightweight construction, inexpensive to manufacture, yet accurate in adjustment and more simple to operate than previous electrode implantation stereotaxic apparatus.

These and other objects and advantages of the present invention will appear more fully in the following specification, claims and drawings in which:

FIGURE 1 is a side elevational view of the apparatus of the present invention showing the same supported in a skull of a patient, the skull being in broken lines;

FIGURE 2 is a top plan view of the apparatus of FIGURE 1;

FIGURE 3 is a sectional view taken on the line 3—3 of FIGURE 1;

FIGURE 4 is a side elevational view of the apparatus of FIGURE 1 looking from the left of FIGURE 1;

FIGURE 5 is an enlarged fragmentary view disclosing the locking means for the electrode supporting carriage, taken substantially on the line 5—5 of FIGURE 4 with parts broken away for purposes of clarity;

FIGURE 6 is a fragmentary sectional view taken on the line 6—6 of FIGURE 1;

FIGURE 7 is a fragmentary sectional view taken on the line 7—7 of FIGURE 1;

FIGURE 8 is a side elevational view similar to FIGURE 1 but showing a modified form of the apparatus of the present invention;

FIGURE 9 is a top plan view of the apparatus shown in FIGURE 8;

FIGURE 10 is a side elevational view looking from the right of FIGURE 8;

FIGURE 11 is a vertical sectional view of a modified form of pivot means for the electrode of the apparatus of FIGURE 8; and FIGURE 12 is a perspective view partly in section illustrating an adapter for the pivot means whereby electrodes of different diameters may be used with the apparatus.

Referring now to the drawings wherein like characters or reference numerals represent like or similar parts, the apparatus of the present invention is illustrated in FIGURE 1 mounted on the skull 10 of a patient. The apparatus generally includes a frame 12, an electrode carriage 14 and a universal socket member 16 which provides for the guiding and pivoting of an electrode 18 carried by the carriage 14. The carriage 14 is adapted to ride on a curved carriage track 20 having a radius of curvature with a center located at the pivot point for the lower end portions of electrode 18. As illustrated in FIGURE 1, the carriage 14 may be moved from the full line position to the dotted line position so as to move the free end of the electrode in a plane passing through the axis of the electrode. In addition, and as will be explained in greater detail later in the specification, the electrode 18 may be moved relative to the carriage 14 along its longitudinal axis into and out of the brain cavity in the skull of a patient, and further, the frame 12 may be so adjusted relative to the universal socket member 16 that the electrode will cover a frusto-conical area within certain limits as it is moved into the brain.

The frame 12 comprises a base portion 22, a pair of upstanding arms 24, and a curved scale 26 for measuring the angle of movement of the electrode 18. The upstanding arms 24 are detachably retained on the ends of the base portion 22 by means of thumb screws 28. Their relative position with respect to the base portion 22 is fixed by pins 30 on the arms extending into suitable bores provided in the ends of the base portion 22. The curved scale 26 which defines a protractor for measuring the angle of movement of the electrode about its pivot point in socket member 16 is suitably attached by screws 32 to the upper ends of the upstanding arms 24. Likewise, the curved carriage track 20 which has the same center of curvature as the protractor is fixed to the arms 24 by means of screws 34.

Referring now to FIGURES 3, 4 and 7, it will be noted that the base portion 22 is provided at its center with an enlarged annular opening 36 extending therethrough, the opening 36 having an undercut portion as indicated as indicated at 38 so as to provide a downwardly facing shoulder 40. Diametrically opposed thumb screws 42 extending through threaded apertures 44 are adapted to detachably retain the socket member 16 in a suitable fixed position relative to a vertical axis through the frame structure.

Referring now to FIGURE 7, the socket member 16 which is adapted to fit within the cavity provided by the undercut portion 38 of opening 36, is provided with an annular groove 46 having an inwardly and downwardly tapered wall 47 for receiving the thumb screws 42. In other words, the thumb screws 42 when threaded toward each other fit into the annular groove 46 and wedge against the wall 47 to cause the socket member to abut against the shoulder 40. This retains the socket member 16 in a fixed position with respect to the frame 12. Upon loosening of thumb screws 42, the frame 12 may be rotated on a vertical axis through the socket member 16 to a desired position. This permits the end of the electrode 18 to cover a circular area in a plane transverse to the vertical axis of the socket member 16. By moving the electrode 18 in a direction along its longitudinal axis, the end of the electrode can therefore be made to cover a frusto-conical area. Further, removal of thumb screws 42 completely out of the grooves 46 in the socket member 16 provides for complete removal of the frame 12 from the socket member 16.

The lower portion of socket member 16 is provided with a threaded extension 48 having a gradually tapered thread. The extensions 48 is adapted to be threaded into a hole of substantially the same diameter as the hole which is drilled or cut into the skull of the patient. In other words, the socket member 16, with the frame structure 12 removed therefrom, is first threaded into an opening provided in the skull of the patient until there is a tight fit of the same. After the socket member 16 has been threaded into the skull, the frame 12 is attached thereto by slipping the base portion 22 onto the socket member 16 and threading inwardly the thumb screws 42.

Socket member 16 is provided with an opening 50 therethrough, the opening 50 being flared outwardly at its lower end as viewed in FIGURE 7 to provide for pivotal movement of the electrode 18. Opening 50 is provided with an upwardly facing curved seat 52 for a plastic ball 54 which has 360° rotation within the socket member 16. A plate 56 with an opening 58 in the center thereof retains the ball 54 on the curved seat 52 in opening 50. Set screws 60 threaded to the socket member 16 and extending through the retaining plate 56 hold the plate in position with the desired pressure on the plastic ball 54. A second plate 62 interposed between the retaining plate 56 and the socket member 16 is provided with a scale 63 so that the angular relationship of the frame 12 with respect to the socket member 16 may be determined at all times. Note that on the base portion 22 of the frame 12, suitable arrows or score lines 68 are provided for determining the relative angular position between the socket member 16 and the frame 12. The plastic ball 54 is provided with a bore 70 therethrough so that the free end portion of the electrode 18 may extend through the ball into the area of the brain.

Referring now to FIGURES 1, 4, 5 and 6, it will be noted that the carriage 14 includes a body portion 72 having an arcuate groove 74 therein complementary in size and curvature to the carriage track 20. A retaining plate 76 attached to the body portion 72 by screws 78 retains the carriage 14 on the carriage track 20 for movement with respect thereto. Set screw 80 threaded into and passing through the retaining plate 76 abuts against the carriage track 20 as indicated at 82 (FIGURE 4) to lock the carriage 14 in a fixed position with respect to the carriage track 20.

Body portion 72 of the carriage 14 is provided with a fixed member 84 having a keyway slot 86 (FIGURE 6) extending longitudinally thereof. An electrode holder 88 having a key 90 complementary to and slidably fitting in the keyway slot 86 is adapted to move wtih respect to the body portion 72. In more detail, a vernier screw 92 rotatably carried on the body portion 72 by a flange 94 is threadably received in the sliding electrode holder 88. Rotation of vernier screw 92 causes the electrode holder 88 to move relative to the body portion 72. A suitable scale 96 is provided on the fixed member 84 and is adapted to cooperate with a reference line 98 provided on the movable electrode holder 88. The vernier screw 92 is provided with a vernier scale 100 (FIGURE 2) adapted to cooperate with a pointer 102 carried on the body portion 72 of the carriage 14. Such an arrangement provides for adjustment of the electrode 18 in a direction along its longitudinal axis.

The electrode holder 88 has fixed thereto for movement therewith an elongated angle member 104 having a V-shaped groove 106. A retaining plate 108 covers the groove 106 and provides a bore for slidably receiving the electrode 18. Set screws 110 threaded through plate 108 engage and frictionally hold the electrode 18 in a desired portion.

The operation of the apparatus just previously described and illustrated in FIGURES 1 to 7 inclusive is as follows. The socket member 16 is threaded into a large hole cut or drilled in the skull 10 of a patient. The socket member 16 which supports the universally movable ball 54 is provided with a scale on its upper surface showing 360° and thus when the frame 12 is slipped onto the socket member it may be rotated to a desired angle with respect to the socket member 16 and then locked thereto by means of thumb screws 42. Once the frame 12 which supports the carriage 14 for the electrode 18 has been positioned on the socket member 16 and locked thereto, the electrode 18 may be adjusted in a direction longitudinally of its axis by rotation of the vernier screw 92. The vernier screw 92 gives a micrometer type of adjustment and the scale 96 and vernier scale 100 make it possible to easily determine the exact amount of movement of the electrode in a direction along its axis.

In addition to the adjustment of the electrode 18 along its longitudinal axis, it may also be pivoted about the center of rotation of ball 54 in a plane parallel to the carriage track 20. This is accomplished by loosening the set screw 80 on carriage 14 and moving the carriage 14 on the curved carriage track 20 either to the right or the left as viewed in FIGURE 1. As shown in broken lines in FIGURE 1, the electrode carriage 14 is set at approximately 27° with respect to an axis through the socket member 16. Assuming the electrode is set at 27° and has been moved inwardly the proper amount by rotation of the vernier screw 92, treatment of the patient can begin. When treatment has ended after a particular length of time and it is desirable to remove the electrode, the entire frame 12 is removed by loosening the thumb screws 42 so that the frame 12 together with the electrode carriage 14 and the electrode 18 may be detached from the socket member 16. The socket member 16 will remain in the patient's skull for further treatment with the electrode. Prior to actual removing of the electrode from the brain of the patient, the angular position of the electrode is determined from the curved scale 26, the depth of penetration is determined from the scale 96 and vernier scale 100 and the angle of the frame 12 with respect to the socket member 16 is determined from the scale 63 of plate 62 carried by the socket member 16. With these data, the physician may at a later time relocate the electrode at the exact same spot for subsequent treatment or he may from X-rays determine the adjustments necessary to move the electrode to another desired position in the same general area.

Referring now to FIGURES 8 through 11 inclusive, a modified form of the apparatus is illustrated. In the apparatus shown in FIGURE 8, the frame 12' is provided with a base portion 22' having an annular opening 36' therethrough for receiving the socket member 16'. Socket member 16' is substantially similar in external configuration to the socket member 16. However, the plastic ball 54' is retained in the curved seat 52' by means of an externally threaded ring nut 56' received in the internal threads provided in the socket member 16'. The upper surface of socket member 16' is provided with a scale 63' which is adapted to cooperate with a score line 68' provided on the base portion 22'.

The frame 12' is provided with a curved carriage track 26' on which the carriage 14' is adapted to slide. Carriage 14' is constructed in substantially the identical manner as carriage 14, but in place of the previously described micrometer type of adjustment, a "Stanley" type of micrometer adjustment for the electrode 18 is provided. The "Stanley" type of micrometer adjustment generally referred to by the numeral 120 is adapted to receive the electrode centrally through the same, the electrode 18 being frictionally locked by means of the set screw 122. Rotation of the knurled member 124 provides movement to the electrode 18 in a direction along its longitudinal axis.

A suitable pointer 126 may be provided on the carriage 14' for cooperating with the curved scale 26'.

The modified form of apparatus shown in FIGURES 8 to 11 is operated in a substantially identical manner to the apparatus discussed in detail in FIGURES 1 to 7 inclusive and therefore it is not necessary to repeat the same herein.

The electrode 18 used with the apparatus described herein may be of conventional type such as a bipolar or unipolar electrode and is connected to a suitable source of electrical energy through the necessary equipment for accomplishing a particular treatment or performing a particular test procedure.

FIGURE 12 discloses an adapter 130 for use with the plastic ball 54 whereby the plastic ball may be used to accommodate electrodes of different diameters. The adapter 130 includes an elongated sleeve 132 having a longitudinal bore therethrough of diameter to receive a desired electrode. The outside diameter of the sleeve 132 is substantially the same as the diameter of the bore 70 in the ball 54. One end of the adapter 130 is enlarged as shown in 134 so as to provide a shoulder for abutting against the outside of the ball. A set screw 138 threaded into the enlarged portion 134 locks the adapter 130 on the electrode with the sleeve 132 in the bore 70 of ball 54. Thus there can be no flexibility of the electrode 18 at its point of pivotal movement with respect to the frame 12 of the apparatus.

It will now be apparent from the foregoing specification that the apparatus of the present invention accomplishes the desired results set forth in the objects. While preferred forms of the invention have been described in detail in the foregoing description, it will be perceived and obvious that the invention is susceptible to some changes and modifications without departing from the principle and spirit thereof. For this reason, the terminology used in this specification is for the purpose of description and not limitation, the scope of the invention being defined in the appended claims.

I claim:

1. In a device for implantation of an electrode in the brain of a patient, the combination comprising: a socket member having a threaded portion adapted to be screwed into an opening in the skull, said socket member having an opening therethrough; an electrode; a ball universally supported in said opening in the socket member and having a bore therethrough adapted for receiving the end portion of the electrode; means to adjustably support the electrode with its free end extending through the bore in said ball when said socket member is screwed through the opening in the skull; and a sleeve having a bore therethrough of a diameter substantially equal to the diameter of the electrode, said sleeve including a portion having an outside diameter equal to the diameter of the bore in said ball and an enlarged shoulder portion for abutting said ball.

2. The structure defined in claim 1 including means for detachably connecting said sleeve to the electrode.

References Cited in the file of this patent

UNITED STATES PATENTS

| | | |
|---|---|---|
| 1,093,112 | Clarke | Apr. 14, 1914 |
| 2,426,958 | Ulett | Sept. 2, 1947 |
| 2,549,836 | McIntyre | Apr. 24, 1951 |
| 2,697,433 | Zehnder | Dec. 21, 1954 |
| 2,969,058 | Parton | Jan. 24, 1961 |
| 3,016,899 | Stenvall | Jan. 16, 1962 |
| 3,017,887 | Heyer | Jan. 23, 1962 |

OTHER REFERENCES

Oliver: The Lancet, "Cup and Bell Apparatus," August 23, 1958, page 401.